(No Model.) 3 Sheets—Sheet 1.
C. S. LEDDELL.
VELOCIPEDE.
No. 342,915. Patented June 1, 1886.
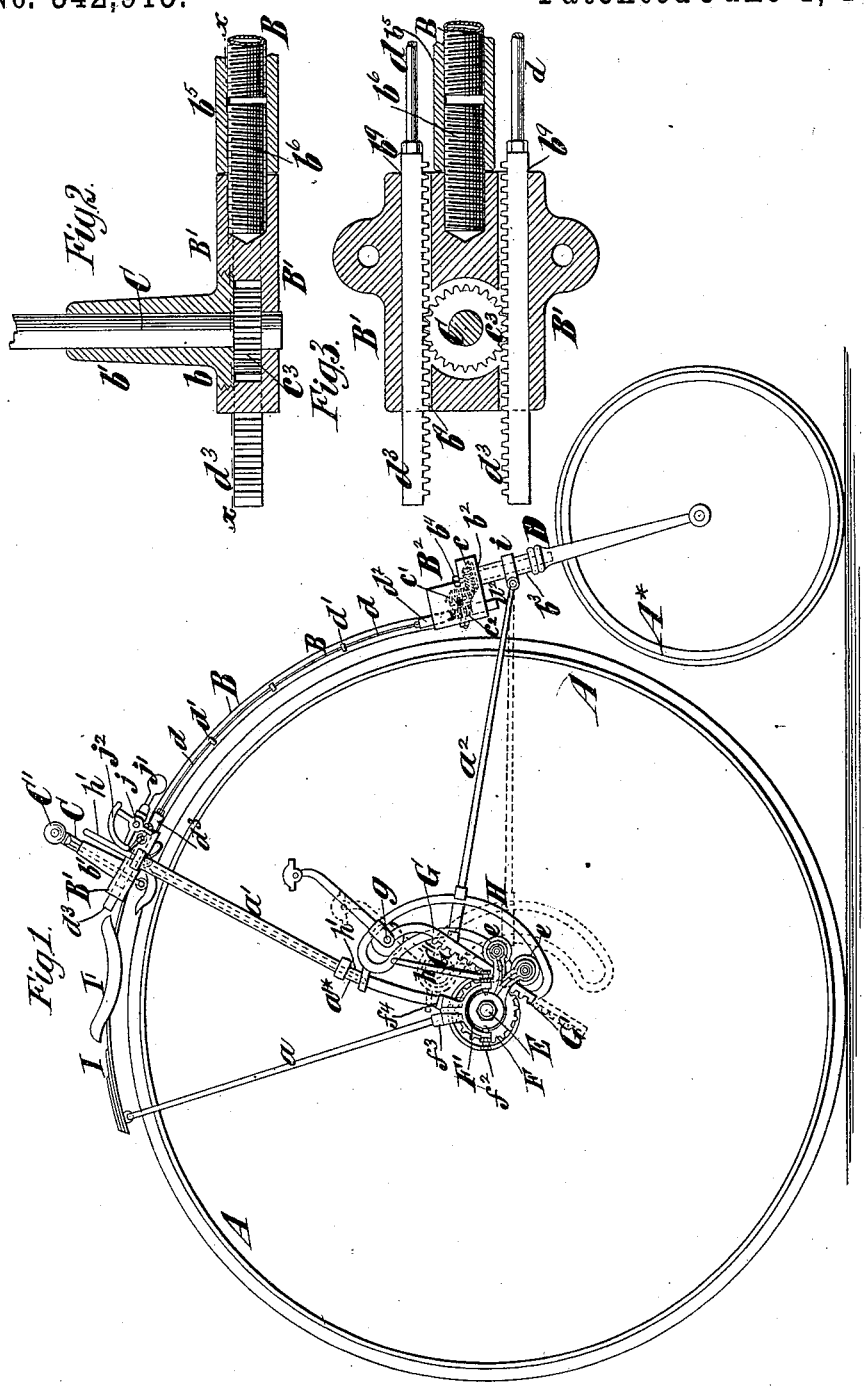
Witnesses.
Emil Hester
C. Sundgren
Inventor:
Charles S. Leddell
by his Att'ys
Brown & Hall

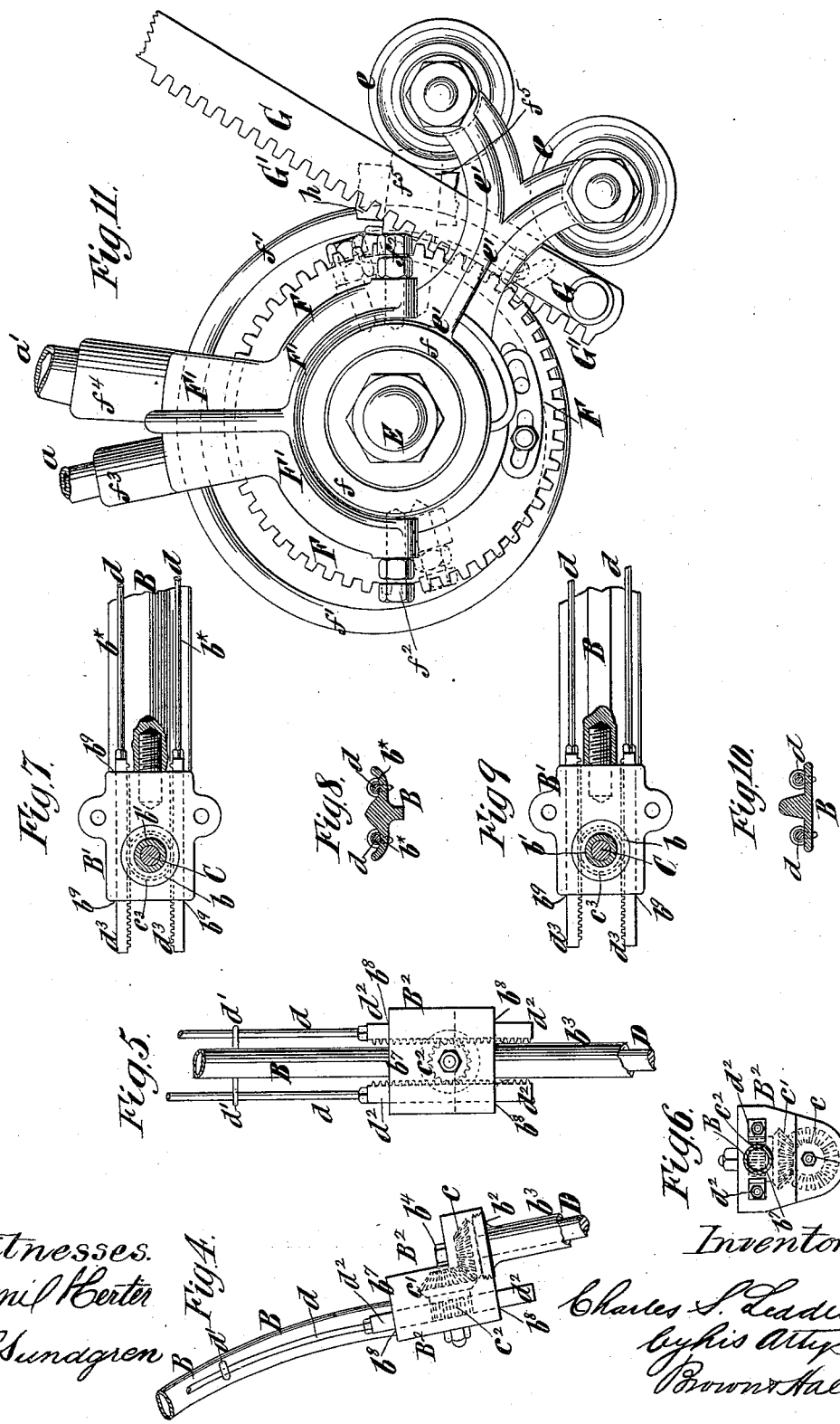

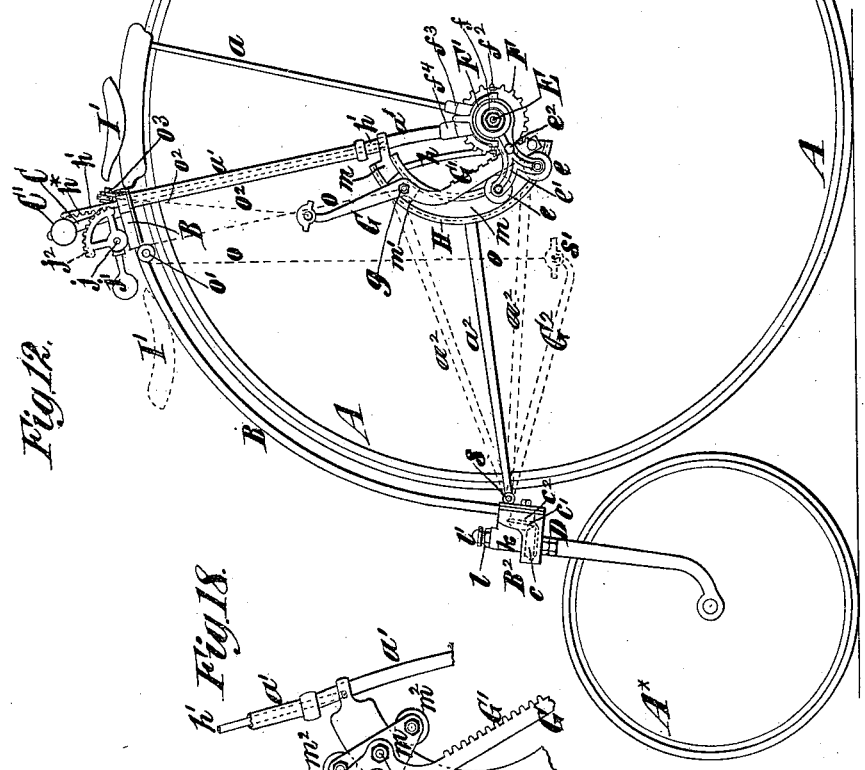

UNITED STATES PATENT OFFICE.

CHARLES S. LEDDELL, OF MORRISTOWN, NEW JERSEY.

VELOCIPEDE.

SPECIFICATION forming part of Letters Patent No. 342,915, dated June 1, 1886.

Application filed September 23, 1885. Serial No. 178,341. (No model.)

*To all whom it may concern:*

Be it known that I, CHARLES S. LEDDELL, of Morristown, in the county of Morris and State of New Jersey, have invented a new and useful Improvement in Pedomotive Vehicles, of which the following is a specification.

My invention is applicable more particularly to bicycles, but one feature of the invention may be employed in tricycles and other pedomotive vehicles for operating the driving wheel or shaft.

Some features of my invention relate to the construction and arrangement of the steering connections, whereby motion is transmitted from the steering spindle or handle at the top of the main frame of a bicycle to the steering-wheel shaft at the bottom of such main frame.

In my United States Letters Patent No. 306,498, dated October 14, 1884, and No. 319,983, dated June 16, 1885, I have shown and described a bicycle which comprises a curved backbone composed of a tube or tubes and steering-connections extending through and wholly concealed within the tube or tubes of the backbone. In that patent the steering-spindle is provided with a wheel or hub, and a similar wheel or hub is secured on or geared with the steering-wheel shaft, and the steering-connections comprise flexible portions, which are passed around and secured to said wheels or hub. Consequently any turning movement of the steering-spindle is transmitted through the steering-connections to the steering-wheel shaft.

One feature of my present invention consists in the combination, with the steering-spindle and steering-wheel shaft of a bicycle, of upper and lower boxes or frame portions wherein said spindle and shaft are supported, a curved backbone connecting said boxes or frame portions, and a steering-connection between said spindle and shaft extending parallel with and along the exterior of the curved backbone and guided thereby.

The invention also consists in novel combinations of parts whereby motion is imparted from the steering-spindle to the steering-wheel shaft, and including one or more steering-connections extending along the curved backbone and guided thereby, and provided at their upper or lower end, or both their upper and lower ends, with racks which engage with or gear into a pinion or pinions. Through the pinion or pinions and the rack or racks gearing therewith the turning motion of the steering-spindle is transmitted to the steering-wheel shaft.

In my United States Letters Patent No. 320,073, dated June 16, 1885, I have shown and described a clutch mechanism for imparting a rotary motion continuously in one direction from a reciprocating and oscillating treadle-lever to the driving shaft or axle of a pedomotive vehicle. In that patent there is a reciprocating rotary clutch-drum, which is turned in one direction by the movement of the treadle-lever in one direction acting through a strap, band, or other flexible connection, and the drum is turned in the other direction and the treadle-lever returned by the action of a spring.

In the aforesaid patent, No. 320,073, I have also shown a curved or arc-shaped guide, along which the fulcrum of the treadle-lever is movable during the swinging motion of the lever upon its pivot or fulcrum.

The feature of my present invention, which relates to an improvement in the mechanism for operating the driving wheel or shaft of the vehicle, consists in the combination, with the driving wheel or shaft, of a treadle-lever having a swinging motion on its pivot or fulcrum and provided with a toothed rack, a guide along which the fulcrum of the treadle-lever is movable during the swinging movements of the lever, and a clutch mechanism for driving the wheel or shaft, comprising an oscillating clutch-drum provided externally with spur-teeth with which the rack of the treadle-lever engages. This feature of my invention also includes other combinations of parts, hereinafter described.

In the accompanying drawings, Figure 1 is a side elevation of a machine embodying my invention. Fig. 2 is a vertical section, on a larger scale, of a box or frame portion at the upper end of the backbone, including the steering-spindle and part of the steering-connections. Fig. 3 is a horizontal section on the plane of the dotted line *x x*, Fig. 2, and on the same scale as Fig. 2. Figs. 4, 5, and 6 are respectively a side elevation, a front elevation, and a plan of the box or frame portion at the lower end of the backbone, the steering-wheel shaft journaled therein, and portions of the steering-connections. Fig. 7 is a plan of the upper box or frame and steering-connections, but showing a backbone of modified form; and Fig. 8 is a transverse section of such modified backbone and the steering-connections. Fig. 9 is a plan similar to Fig. 7, but showing a backbone of another modified form. Fig. 10 is a transverse section of the backbone and connections shown in Fig. 9. Fig. 11 is a detail side view, upon a larger scale than Fig. 1, of the mechanism for operating the driving wheel or shaft. Fig. 12 is a side elevation of a bicycle embodying certain features of my invention in a slightly modified form. Fig. 13 is a vertical section of the upper box or frame portion of the machine shown in Fig. 12. Fig. 14 is a horizontal section on the plane of the dotted line $y\,y$, Fig. 13. Fig. 15 is a vertical section of the lower box or frame portion in the same plane with the driving-wheel. Fig. 16 is a front elevation of such lower box or frame portion. Fig 17 is a plan of the lower box or frame portion and a horizontal section of the backbone; and Fig. 18 is a detail view of the treadle-lever and a portion of its guide, showing a slight modification of the invention. Figs. 13 to 18, inclusive, are upon a larger scale than Fig. 12.

Similar letters of reference designate corresponding parts in all the figures.

Referring first to Figs. 1 to 11, inclusive, A A* designate, respectively, the driving and steering wheels, which may be of any suitable construction. The driving-wheel supports a fixed frame, which, as here shown, comprises braces $a\,a'\,a^2$, a curved backbone, B, which conforms approximately to the curvature of the wheel A, and upper and lower boxes or frame portions B' B² at the ends of the backbone. A steering spindle, C, having at the top a steering-handle, C', is journaled in the upper box, B', and the forked steering-shaft D is journaled in the lower box, B².

The construction of the upper box, B', is best shown in Figs. 2 and 3. It has an opening at the top, and is there closed by a cap or bonnet, $b$, from which a long hub or sleeve, $b'$, projects upward and forms a bearing for the spindle C.

The construction of the lower box, B², is best shown in Figs. 4, 5, and 6. It has an opening in the under side, which is closed by a cap or bonnet, $b^2$, having a long hub, $b^3$, which forms a bearing for the forked shaft D, and a set-screw, $b^4$, inserted in its top, forms a thrust-bearing for the top of the shaft and properly regulates the relation of the bevel-wheels $c\,c'$, through which the shaft receives motion. The bevel-wheel $c'$ is here shown as made in the same piece with or rigidly secured to a pinion, $c^2$, and the wheels or pinions $c'\,c^2$ are contained in a cavity in the back of the box B², and rotate as one wheel.

The backbone in the example of my invention shown in Figs. 1 to 6, inclusive, is composed of a single tube, B, the upper end of which is connected by a coupling-nut, $b^5$, with a nipple, $b^6$, projecting from the upper box, B', and the lower end of which is screwed into or otherwise secured in a socket or projection, $b^7$, on the lower box, B². The coupling $b^5$, which has right and left hand threads, provides for elongating or contracting the length of the backbone to suit the steering-connections, which I will now describe.

The steering-spindle C has upon it, within the box B', a pinion, $c^3$, similar to the pinion $c^2$, at the lower end of the backbone. The steering-connections here shown consist of wires or rods $d$, which may be of steel, and are arranged at opposite sides of and upon the exterior of the backbone B. These rods or wires are curved to conform to the curvature of the backbone and extend along the same, and are fitted to guides or eyes $d'$, projecting from the backbone B. The lower ends of the curved rods or wires are connected with short racks $d^2$, which are fitted to reciprocate in guides $b^8$ in the box B² and engage with opposite sides of the pinion $c^2$, and the rods or wires have projecting from their upper ends similar racks, $d^3$, which are fitted to reciprocate in guides $b^9$ in the upper box, B', and engage with opposite sides of the wheel or pinion $c^3$.

From the above description it will be understood that when any turning movement is imparted to the spindle C and wheel $c^3$ in one or other direction such movement will be transmitted through the racks $d^3\,d^2$ and rods or wires $d$ to the wheel or pinion $c^2$, and through the bevel-wheels $c\,c'$ will be imparted to the forked shaft D, wherein the steering-wheel is journaled.

The backbone B may be of other than tubular form. I have in Figs. 7 and 8 shown a backbone, B, consisting of a rolled and bent bar, in the top of which are concave channels $b^*$ for the curved rods or wires $d$.

In Figs. 9 and 10 I have shown a backbone, B, consisting of a rolled bar made in the form of an inverted-T beam, and the curved rods or wires are arranged on opposite sides of the central web thereof.

I will now describe the driving mechanism. E is the main or driving shaft, on which is the wheel A, and on each side of the wheel is a clutch mechanism which comprises a drum, F, to which a reciprocating rotary motion, or a rotary motion alternately in opposite directions, is to be imparted. This clutch mechanism may be like that shown in my aforesaid Letters Patent No. 320,073, or of any other suitable character wherein such a drum is employed. The drum F is formed with spur-teeth on its periphery, and is operated by a treadle-lever, G, having upon it a rack, G', which engages with the spur-teeth of the drum, and is held in engagement therewith by rollers $e$, supported in an oscillating frame, $e'$, which is capable of turning freely on boxes or hubs $f$, which are secured on the shaft E. When the lever G is forced down or moved in one direction, the drum F will be turned in one direction and motion imparted to the wheel A. When pressure on the lever is relieved, the drum will be returned by a spring, $f'$, attached at one end to the frame or yoke portion F' and at the other end to the oscillating frame $e'$. The fulcrum $g$ of the lever G is movable along a curved or arc-shaped guide, H, which may be slotted and adjustable like the guide shown in my aforesaid Letters Patent No. 320,073. The frame or yoke portions F' are supported by set-screws $f^2$ on the boxes or hubs $f$, and the frame portion or brace $a$ may be fast in a socket, $f^3$, formed on such yoke, and support at the upper end a spring, I, on which the seat I' is supported. The frame portion or brace $a'$ may consist of a tube, the upper end of which is rigidly attached to the upper box B', and the lower portion of which may be offset, as at $a'^*$, and be secured in a socket, $f^4$, on the yoke F'. The guide H may have a rod or bar, $h$, extending between its ends, and this rod may fit an eye or bearing, $f^5$, on the yoke F'. A rod, $h'$, for raising and lowering the guide H may extend from the upper end of the guide H upward through the tubular frame portion $a'$. The rods $h'$ at opposite sides of the machine may be operated by the means shown in my aforesaid Patent No. 320,073. These means consist of a shaft, $j$, journaled on the upper box, B', and capable of being turned by a handle, $j'$, which is itself screw-threaded, and may be operated to lock the shaft $j$ after turning. On the shaft $j$ are sectors $j^2$, which are connected with the rods $h'$ by wire cords or other flexible devices, so that the turning of the sectors raises or lowers the rods $h'$. The brace $a^2$ is shown as attached to the guide H, and at its other end is pivoted to a collar, $i$, which is clamped on the sleeve or hub projecting downward from the lower box, B².

The brake may be operated in any suitable manner, as, for example, by a rod extending through the steering-spindle C, as in my aforesaid Patent No. 306,498, or in my Letters Patent No. 319,983, dated June 16, 1885.

In Fig. 1 I have represented the guide H in full lines as in its highest position, and when in that position the treadle-lever, during its downward or working movement, will have a lengthwise motion on the clutch-drum, which may turn the drum and axle about three-fourths of a turn, and which, added to the one-fourth turn which results from the oscillating or swinging movement of the lever, will give about one turn of the wheel to each working-stroke of the lever. In my Patent No. 320,073 I have described that by lowering the guide into a position concentric with the axle E the treadle-lever would operate with greatly-increased power, because the wheel would then only receive about one-fourth a turn due to the swinging movement of the lever G and roller-frame $e\ e'$ about the axle. In that patent I have also described that by lowering the guide H to its lowest position eccentric with the axle and properly adjusting the clutch the motion of the wheel would be reversed. I have in Fig. 1 shown by dotted lines the guide and lever in such lowermost position. When in this position, the oscillating or swinging movement of the lever would still tend to turn the wheel in one direction about one-fourth of a turn; but the lengthwise movement of the treadle-lever G would tend to turn the wheel about three-fourths of a turn in the other direction, and, consequently, the effective rotation of the wheel would be about one-half a turn to each working stroke of the lever when running the machine with the large driving-wheel in advance and with the seat I' reversed, as shown by dotted lines.

I have hereinabove referred to each working stroke of the treadle-lever G as producing one turn of the wheel for the sake of convenience. It will of course be understood that by varying the size of the clutch-drum F or the diameter of the circle of teeth with which the lever engages, or the length of the guide H, the extent of turning movement imparted to the wheel by each working stroke of the lever may be increased or diminished.

Referring now to Figs. 12 to 18, inclusive, the same letters of reference designate the parts which are similar to those before referred to, and I will only describe the features of difference.

The backbone consists of two parallel curved channel-bars B, which are connected at their upper ends with the upper box, B', and at their lower ends with the lower box, B². The steering-connections $d$ lie one in each channel. These steering-connections have racks $d^2\ d^3$ at their lower and upper ends, guided in the boxes B² B', and gearing with pinions $c^2$ $c^3$, all as before described. The upper box, B', is closed by a cap, $b\ b'$, and contains the steering-spindle C, through which passes the brake-operating rod C² and the pinion $c^3$, fast on the spindle C. The brake C³ is like that shown in my aforesaid Letters Patent No. 319,983. The construction of the lower box, B², wherein the steering-wheel shaft D is journaled, is also very similar to that shown in my aforesaid Letters Patent No. 319,983. The box is closed at the bottom by a cap or bonnet, $b^2$, and has an upwardly-projecting sleeve or hub, $k$, which receives the upper end of the shaft D, and into which is screwed a plug, $l$, forming a thrust-bearing for the shaft. The plug $l$ is perforated for the introduction of oil, and is protected against dust by a cap-nut, $l'$. The box B² has a removable cap or plate, $l^2$, at the back, to afford access to the spur-pinion $c^2$, with which the steering-racks $d^2$ engage, and the bevel-pinion $c'$, which gears with the bevel-pinion $c$ on the shaft D. In this example of my invention the curved or arc-shaped guide H consists of a round or flat bar destitute of a slot, and which may have a dovetailed or undercut groove or channel, $m$, in its face to receive a slide, $m'$, to which the treadle-lever G is fulcrumed at $g$. This slide $m'$, instead of fitting a channel, $m$, as in Fig. 12, may be provided with anti-friction rollers $m^2$, which run upon opposite sides of the curved guiding-bar H, as shown in Fig. 18.

In the example of my invention shown in Fig. 12 the braces $a^2$ are shown as pivoted at their forward ends to the box $B^2$, and in lieu of a single brace two may be employed, as shown by dotted lines in Fig. 12, they being connected to the upper and lower ends of the guide H.

I have in Fig. 12 shown a step, $e^2$, to be used in mounting the machine, projecting from the oscillating frame $e'$.

In Fig. 12 the mechanism $j\ j'\ j^2$, for operating the rods $h'$ to raise and lower the guides H, is like that before described, and also like that shown in my former patent, No. 320,073, save that the sectors $j^2$ are provided with spur-teeth, gearing into racks $h^*$, cut in the upper portions of the rods $h'$.

I have in all the examples of my invention represented the steering-connections $d$ as provided at their upper and lower ends with racks engaging with pinions; but it is obvious that such racks might be provided at the upper ends or lower ends only, and the opposite ends of the steering-connections would then have a wire, cord, chain, or other flexible connection passing around and attached to a wheel or hub, as in my Patents Nos. 306,498 and 319,983. It is also obvious that if a steering-connection, $d$, were made stiff enough to transmit power either by a pull or a push, a single connection would serve to transmit motion in both directions to the steering-wheel shaft.

In Fig. 12 I have shown, in addition to the treadle-levers G, which are employed when using the machine with the small wheel in advance, other treadle-levers, $G^2$, which may be employed when it is desired to run the machine with the large wheel in advance. In such case the seat I' would be shifted to the position shown by dotted line. The levers $G^2$ may be pivoted at the point of support of the braces $a^2$, as shown at $s$, and are provided at their other ends with pedals $s'$. Their pivoted ends should have long bearings to prevent lateral motion. From the free or pedal ends of the levers $G^2$ cords or other flexible connections, $o$, extend upward over sheaves $o'$, and thence downward, and are connected to the levers G at their fulcrums $g$. If desired, the connections $o$ might be attached to the pedal extremities of the levers G, and the levers $G^2$ would then have a much greater stroke or length of movement. By depressing the lever $G^2$, which is in the drawings represented as in its lowest position, the lever G will be raised to its highest position, as shown, the working stroke being upward. By properly adjusting the clutch the rider may, by means of the supplemental levers $G^2$ and connections $o$, obtain all the advantages of the eccentric guide H while running the machine with the large wheel in advance.

As a substitute for the levers $G^2$ and connections $o$, I may connect the levers G on opposite sides of the machine by a cord or other flexible connection, $o^2$, passing over a sheave, $o^3$, at the top of the frame, as shown in Fig. 12. The rider could then use the treadle-levers G while running with the large wheel ahead, and the upward stroke of the levers G would be the working stroke, the downward stroke of each lever producing the upward stroke of the lever on the opposite side of the machine.

I am aware that it is not new to employ a rack and pinion gearing in connection with the driving and steering mechanism of pedomotive vehicles, and hence I do not claim such a combination, broadly.

What I claim as my invention, and desire to secure by Letters Patent, is—

1. The combination, with the steering-spindle and steering-wheel shaft of a bicycle, of upper and lower boxes or frame portions wherein said spindle and shaft are supported, a curved backbone connecting the boxes or frame portions, and steering-connections between the spindle and shaft extending along the exterior of the curved backbone and guided thereby, substantially as herein described.

2. The combination, with the steering-spindle and steering-wheel shaft, of upper and lower boxes or frame portions and a curved backbone connecting them, a pinion in the lower box or frame through which motion is imparted to the steering-wheel shaft, and a steering-connection extending along the curved backbone and provided at the lower end with a rack gearing with the pinion, substantially as herein described.

3. The combination, with the steering-spindle and steering-wheel shaft, of upper and lower boxes or frame portions and a curved backbone connecting them, a pinion in the upper box or frame upon the steering-spindle, and a steering-connection extending along and guided by the backbone and provided at the upper end with a rack gearing with the pinion on the steering-spindle, substantially as herein described.

4. The combination, with the steering-spindle and steering-wheel shaft of a bicycle, of upper and lower boxes or frame portions wherein said spindle and shaft are journaled, a curved backbone connecting said boxes or frame portions, steering-connections extending along the backbone and guided thereby, racks upon the upper and lower ends of the steering-connections, a pinion on the steering-spindle gearing with the rack at the upper ends of the steering-connections, and a pinion gearing with the racks at the lower ends of the steering-connections and through which motion is transmitted to the steering-wheel shaft, substantially as herein described.

5. The combination, with a driving wheel or shaft, of a treadle-lever having a swinging movement on its pivot or fulcrum and provided with a toothed rack, a guide along which the fulcrum of the treadle-lever is movable during the swinging movements of the lever, and a clutch mechanism for driving the wheel or shaft comprising an oscillating clutch-drum provided externally with spur-teeth with which the rack on the treadle-lever engages, substantially as herein described.

6. The combination, with the driving wheel or shaft and a clutch mechanism for driving the same, comprising a clutch-drum having a reciprocating rotary motion, of a treadle-lever for operating the clutch-drum, a slide to which the lever is fulcrumed, and a guide consisting of a solid curved or arc-shaped bar to which the lever-slide is fitted, substantially as herein described.

7. The combination, with the upper box or frame portion, the tubular frame portions $a'$, extending downward therefrom, and the guides H, of the rods $h'$, connected at their lower ends with the guides H, and provided on their upper portions with racks $h^*$, and the shaft $j$, provided with the toothed sectors $j^2$, engaging with said rods for shifting them, and with the handle $j'$, for turning the shaft and sectors, substantially as herein described.

8. The combination, with the driving wheel or shaft, the clutches and treadle-levers G, for operating the same, and the curved guides H, along which the lever-fulcrums are movable, and which may be adjusted to positions eccentric to the driving wheel or shaft, of connections whereby the levers G may be operated to turn the wheel or shaft in their upward movement when running with the driving-wheel in advance, substantially as herein described.

9. The combination, with the driving wheel or shaft, the clutches and treadle-levers G, for operating the same, and the curved guides H, along which the lever-fulcrums are movable, and which may be adjusted to positions eccentric to the driving wheel or shaft, of the treadle-levers $G^2$ and connections O, whereby the levers G may be operated to turn the wheel or shaft in their upward movement when running with the driving-wheel in advance, substantially as herein described.

CHARLES S. LEDDELL.

Witnesses:
C. HALL,
FREDK. HAYNES.